(12) United States Patent
Bingaman et al.

(10) Patent No.: US 9,656,405 B2
(45) Date of Patent: May 23, 2017

(54) VERIFYING CALIBRATION POINTS AGAINST MARK LINES ON WORKPIECE SURFACES

(71) Applicant: THE BOEING COMPANY, Chicago, IL (US)

(72) Inventors: Kyle A. Bingaman, Highland, IL (US); Christopher M. Weingart, St. Peters, MO (US)

(73) Assignee: THE BOEING COMPANY, Chicago, IL (US)

(*) Notice: Subject to any disclaimer, the term of this patent is extended or adjusted under 35 U.S.C. 154(b) by 276 days.

(21) Appl. No.: 14/229,552

(22) Filed: Mar. 28, 2014

(65) Prior Publication Data

US 2015/0273713 A1 Oct. 1, 2015

(51) Int. Cl.
| | | |
|---|---|---|
| *B26D 1/00* | (2006.01) | |
| *B26F 3/00* | (2006.01) | |
| *B26D 5/00* | (2006.01) | |
| *B23Q 35/40* | (2006.01) | |
| *B26F 1/38* | (2006.01) | |

(52) U.S. Cl.
CPC ............. *B26F 3/004* (2013.01); *B23Q 35/40* (2013.01); *B26D 5/007* (2013.01); *B26F 1/3813* (2013.01); *Y10T 83/0495* (2015.04); *Y10T 83/505* (2015.04)

(58) Field of Classification Search
CPC ........ B26D 5/007; B26F 1/3813; B26F 3/004; B23Q 35/40

USPC ............. 83/23, 33, 365, 72, 76.1, 76.7, 76.8
See application file for complete search history.

(56) References Cited

U.S. PATENT DOCUMENTS

| | | | | |
|---|---|---|---|---|
| 5,508,936 | A * | 4/1996 | King ..................... | B26D 5/00 382/111 |
| 2005/0166744 | A1* | 8/2005 | Berge .................... | B26D 5/005 83/879 |
| 2012/0194791 | A1* | 8/2012 | Duss ..................... | B41F 13/025 355/53 |
| 2013/0327195 | A1* | 12/2013 | Routamaa ............ | G01N 1/2813 83/13 |
| 2016/0090695 | A1* | 3/2016 | Heap .................... | D21G 9/0009 700/128 |

* cited by examiner

*Primary Examiner* — Omar Flores Sanchez
(74) *Attorney, Agent, or Firm* — Patterson + Sheridan, LLP

(57) ABSTRACT

Methods for verifying calibration points against mark lines on workpiece surfaces are disclosed. Other embodiments including related systems are also disclosed. A material removal component may precisely remove extraneous material from a workpiece when calibration points of the material removal component along a predetermined trajectory are aligned with a mark line upon a marked surface of a workpiece. The marked surface of the workpiece may be disposed opposite of the material removal component. By employing an optical device aligned with the material removal component, calibration points may determined along the marked surface of the workpiece and verified against the mark line. In this manner, the extraneous material may be efficiently removed while minimizing rework and/or destruction of the workpiece.

17 Claims, 6 Drawing Sheets

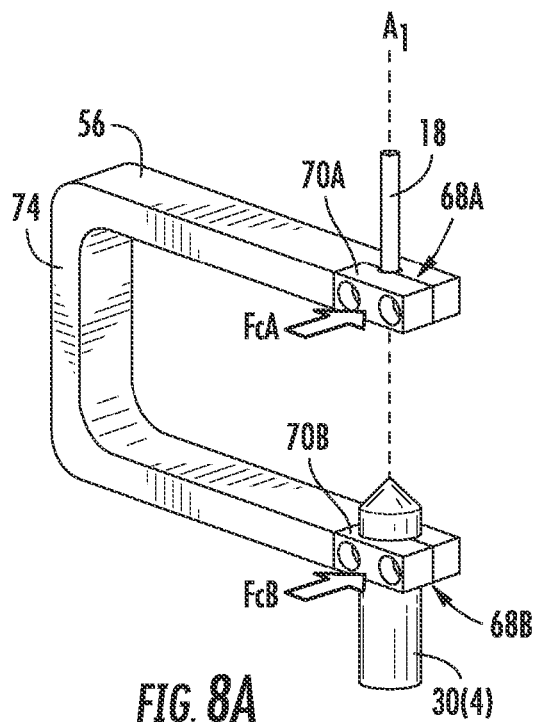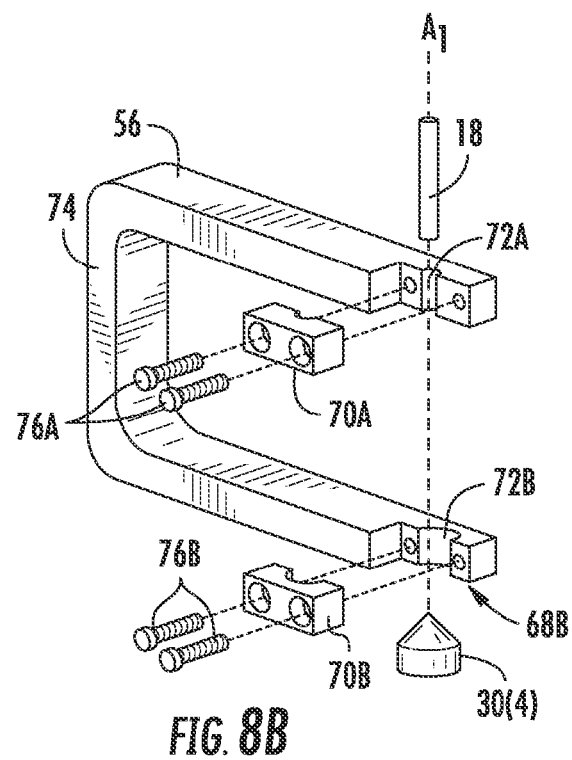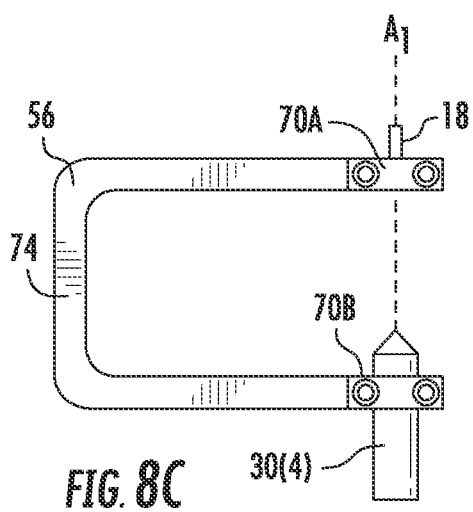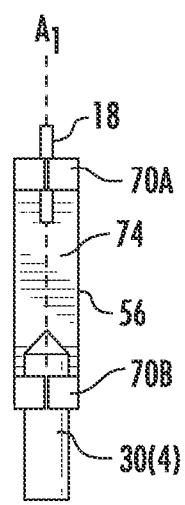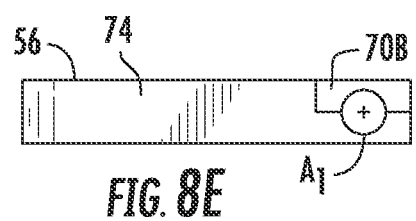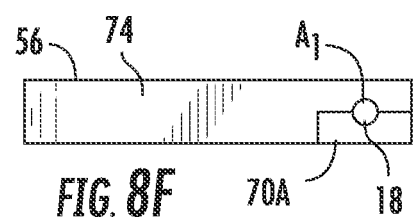

VERIFYING CALIBRATION POINTS AGAINST MARK LINES ON WORKPIECE SURFACES

BACKGROUND

The present disclosure relates to control of manufacturing tools, and more specifically, to controlling manufacturing tools to follow a mark line disposed on a surface of a workpiece.

As demand increases for higher performance products at reasonable cost, products may have to be constructed from components that may have to be more precisely shaped while also being more economical to produce. In order to form components exceeding these requirements, an incomplete component, herein called a "workpiece" may undergo one or more manufacturing operations to remove extraneous material from the workpiece to form a finished component. One manufacturing operation may include removing extraneous material of the workpiece by moving at least one of a material removal component and the workpiece relative to each other upon a predetermined trajectory, in some embodiments called a "tool path," to remove the extraneous material. The predetermined trajectory may be accomplished, for example, by computer numerical control (CNC).

Sometimes workpieces include complex shapes and sizes that are challenging to manufacture because of a difficulty to locate the predetermined trajectory relative to the workpiece. A mark line (also known as a "scribe line"), for example a groove or scribe upon a surface of the workpiece, may serve as a location reference for the predetermined trajectory to ensure the predetermined trajectory may be precisely located upon the workpiece. Sometimes the mark line may be located upon a workpiece surface which faces the material removal component. In this situation, the mark line and machine removal component are proximate to each other. A proximate relationship conveniently enabling manufacturing personnel to ensure that the mark line and the material removal component are aligned along the predetermined trajectory resulting in efficient and precise removal of extraneous material may occur with precision.

Sometimes the mark line is located on a workpiece surface opposite the material removal component. Issues may arise in this case, because it may be difficult to precisely align the predetermined trajectory to the mark line. If misaligned, essential material may be inadvertently removed from the workpiece, resulting in rework or destruction of the workpiece.

SUMMARY

Embodiments enclosed herein include methods for verifying calibration points against mark lines on workpiece surfaces. Other embodiments including related systems are also disclosed. A material removal component may precisely remove extraneous material from a workpiece when calibration points of the material removal component along a predetermined trajectory are aligned with a mark line upon a marked surface of a workpiece. The marked surface of the workpiece may be disposed opposite of the material removal component. By employing an optical device aligned with the material removal component, calibration points may determined along the marked surface of the workpiece and verified against the mark line. In this manner, the extraneous material may be efficiently removed while minimizing rework and/or destruction of the workpiece.

In one embodiment, a method of removing extraneous material from a workpiece is disclosed. The method includes disposing the workpiece between an optical device and a material removal component of a material removal system. The optical device is aligned relative to a central axis of the material removal component and the workpiece includes a marked surface having a mark line facing the optical device. The method includes verifying positions of a calibration point of the optical device relative to the mark line while moving at least one of the material removal component and the workpiece relative to each other along a predetermined trajectory, wherein the calibration point is on the central axis at the marked surface. The method includes verifying positions of a calibration point of the optical device relative to the mark line while moving at least one of the material removal component and the workpiece relative to each other along a predetermined trajectory. The calibration point is on the central axis at the marked surface. The method also includes removing, with the material removal component, extraneous material from the workpiece along the predetermined trajectory. In this manner, rework of the workpiece is minimized.

In another embodiment, a material removal system is disclosed. The system includes a material removal component configured to remove material from the workpiece when at least one of the material removal component and the workpiece move relative to each other along a predetermined trajectory. The system includes an optical device configured to be aligned relative to a central axis of the material removal component. The optical device is configured to define positions of a calibration point upon a marked surface of a workpiece. The workpiece is disposed between the material removal component and the optical device. The calibration point is on the central axis and verifiable to a mark line on the marked surface facing the optical device. In this manner, the extraneous material of the workpiece is efficiently removed.

In another embodiment, a computer program product for verifying a material removal component against a mark line of a workpiece is disclosed. The computer program product includes a computer-readable storage medium having computer-readable program code embodied therewith. The computer-readable program code includes computer-readable program code configured to move at least one of the material removal component and a workpiece relative to each other along a predetermined trajectory as an optical device is aligned relative to a central axis of the material removal component. The workpiece is disposed between the optical device and the material removal component, and the workpiece includes a marked surface having the mark line facing the optical device. The computer-readable program code also includes a computer-readable program code configured to verify positions of the calibration point relative to the mark line while moving at least one of the material removal component and the workpiece relative to each other along the predetermined trajectory. The calibration point is disposed on the central axis at the marked surface. The computer-readable program code also includes computer-readable program code configured to instruct removal of material from the workpiece along the predetermined trajectory with the material removal component. In this manner, the material removal component precisely removes extraneous material from the workpiece.

BRIEF DESCRIPTION OF ILLUSTRATIONS

FIGS. 1A through 1C are a left side schematic view, a bottom view, and a front side schematic view, respectively, of an exemplary workpiece disposed within an exemplary material removal system, illustrating at least one of the workpiece and a material removal component of the material removal system moving relative to each other along a predetermined trajectory during a verification of the predetermined trajectory against a mark line of the workpiece. The mark line is disposed on a marked surface opposite the material removal component;

Figure 7:
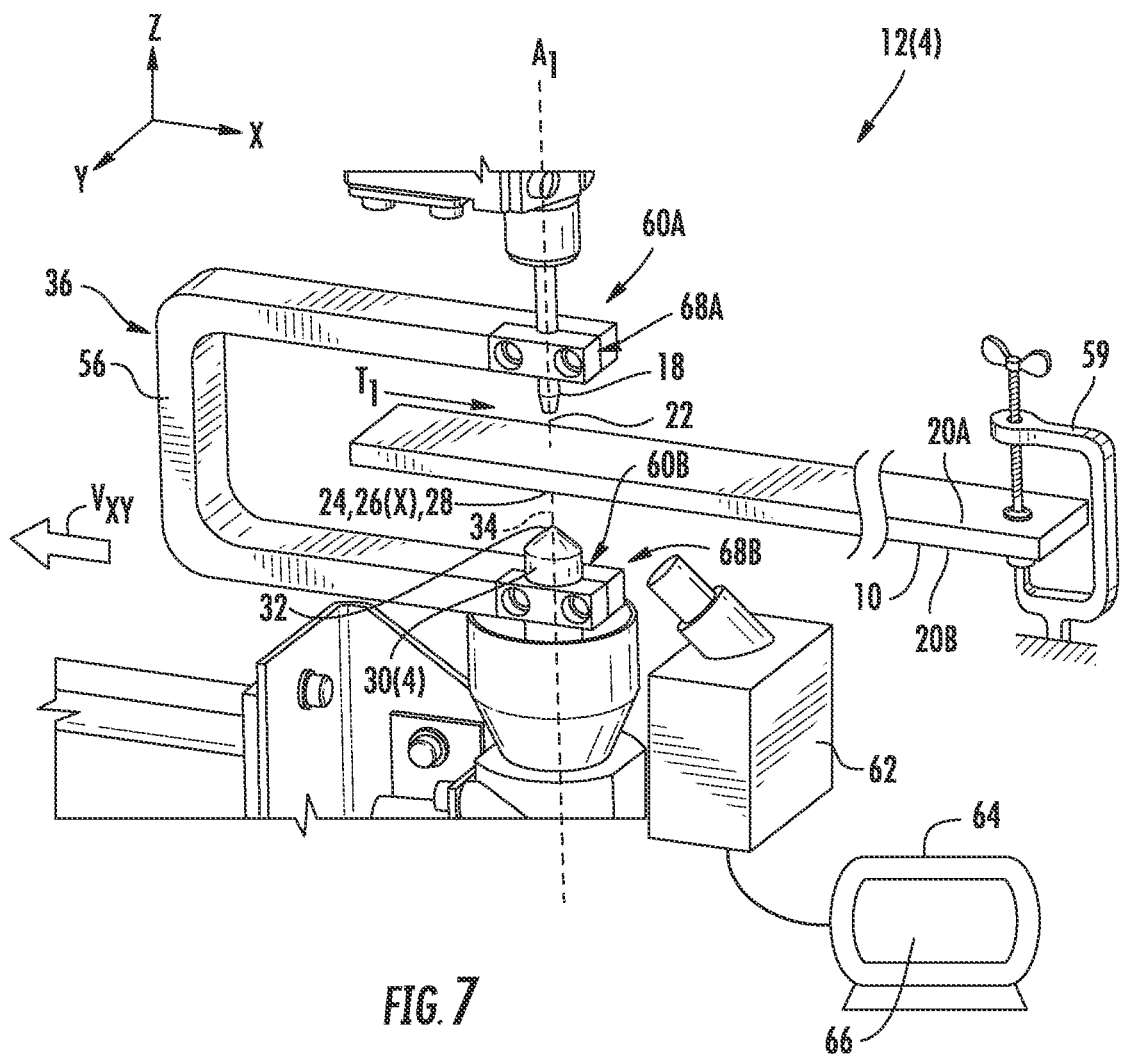

FIG. 7 is a top perspective view of another embodiment of an exemplary material removal system which verifies a predetermined trajectory against a mark line using an alignment component comprising a bracket to align an optical device to a material removal component; and FIGS. 8A through 8F are a top perspective view, top perspective exploded view, left side view, front side view, bottom view, and top view, respectively, of the bracket secured to the material removal component and optical device of FIG. 7.

DETAILED DESCRIPTION

Embodiments enclosed herein include methods for verifying calibration points against mark lines on workpiece surfaces. Other embodiments including related systems are also disclosed. A material removal component may precisely remove extraneous material from a workpiece when calibration points of the material removal component along a predetermined trajectory are aligned with a mark line upon a marked surface of a workpiece. The marked surface of the workpiece may be disposed opposite of the material removal component. By employing an optical device aligned with the material removal component, calibration points may determined along the marked surface of the workpiece and verified against the mark line. In this manner, the extraneous material may be efficiently removed while minimizing rework and/or destruction of the workpiece.

Figure 1A:
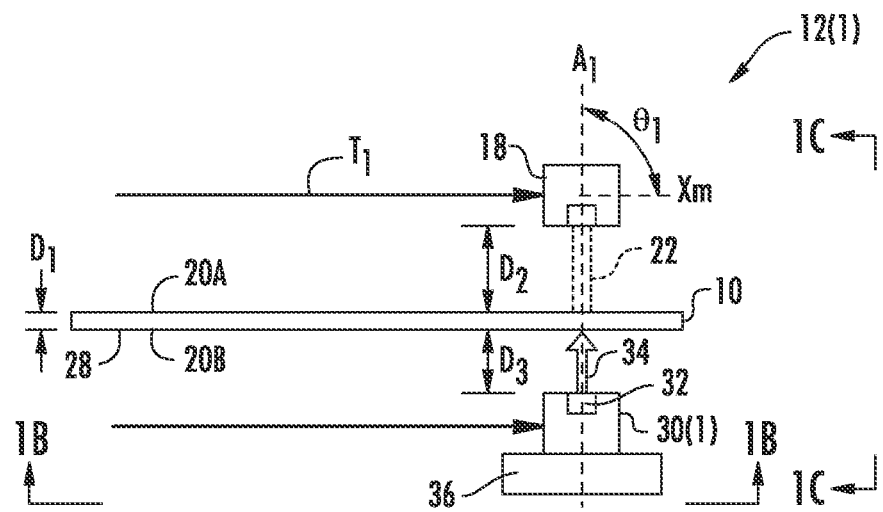
Figure 1B:
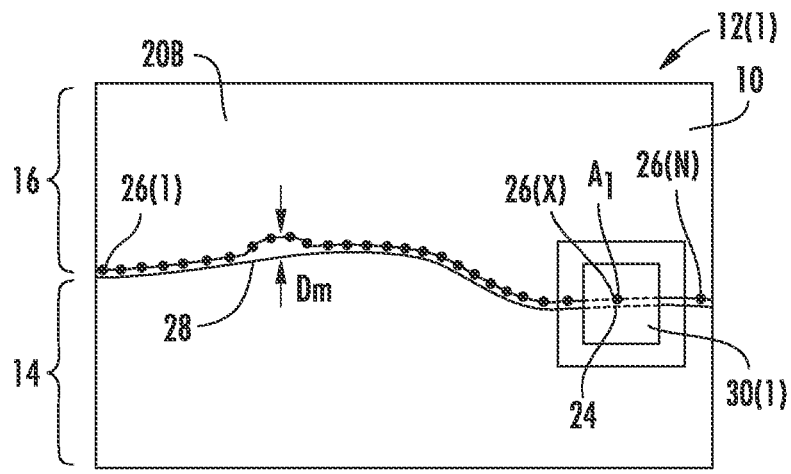
Figure 1C:
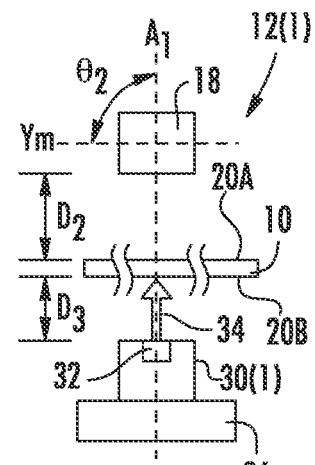

In this regard, FIGS. 1A through 1C are a left side schematic view, a bottom view, and a front side schematic view, respectively, of a workpiece 10 disposed within an exemplary material removal system 12(1) configured to remove extraneous material 14 of a workpiece 10 from desired material 16 of the workpiece 10. At least one of the workpiece 10 and a material removal component 18 of the material removal system 12(1) move relative to each other along a predetermined trajectory T1 during a verification of the predetermined trajectory T1 using computer numerical control (CNC). The predetermined trajectory T1 may be verified when a central axis A1 (also known as a "tool control point" or "TCP") of the material removal component 18 is virtually extended through the workpiece 10 from a first surface 20A to a marked surface 20B of the workpiece 10. The marked surface 20B is opposite of the material removal component 18. In embodiments when the material removal component 18 includes a removal element 22 comprising either a water jet, milling cutter, router, or a laser beam, then the central axis A1 may be, for example, a tool control point or "TCP" of the water jet, milling cutter, router, or laser beam. A calibration point 24 is formed at an intersection of the central axis A1 and the marked surface 20B at a position 26(x). The calibration point 24 is on the marked surface 20B even in other situations when the material removal component 18 does not remove material through a thickness D1 of the workpiece 10. As at least one of the material removal component 18 and the workpiece 10 move relative to each other along the predetermined trajectory T1, the calibration point 24 moves along the marked surface 20B of the workpiece 10 to occupy positions 26(1)-26(N) along the marked surface 20B. As an example, the positions 26(1), 26(N) may be associated with opposite ends of the predetermined trajectory T1, and the position 26(x) may be an arbitrary position selected from the positions 26(1)-26(N). Verification occurs when each of the positions 26(1)-26(N) of the calibration point 24 are disposed within a maximum distance $D_M$ (FIG. 1B) of a mark line 28 disposed on the marked surface 20B.

In order to facilitate the verification of the predetermined trajectory T1, the workpiece 10 is disposed between the material removal component 18 and an optical device 30(1). The optical device 30(1) may be aligned relative to the central axis A1 and the marked surface 20B may face the optical device 30(1). The optical device 30(1) may be configured to determine the position 26(x) of the calibration point 24 based on a relative position of the optical device 30(1) to both the central axis A1 and the marked surface 20B. In one embodiment, the optical device 30(1) comprises a light source 32, for example a laser, emitting a light 34 at the marked surface 20B and along the central axis A1 of the material removal component 18. The point of incidence of the light 34 upon the marked surface 20B may be the calibration point 24 at the position 26(x) and may be visibly identified and compared against the mark line 28 as part of the verification of the predetermined trajectory T1.

Other positions 26(1)-26(N) of the calibration point 24 may be determined by using the optical device 30(1). The optical device 30(1) may be movable to maintain a stationary position relative to the material removal component 18, as at least one of the material removal component 18 and the workpiece 10 move relative to each other along the predetermined trajectory T1. The stationary position of the optical device 30(1) with respect to the material removal component 18 is maintained by an alignment component 36 which may comprise, for example, mechanical or electro-mechanical components. In this way, the optical device 30(1) may be utilized to determine the positions 26(1)-26(N) of the calibration point 24 upon the marked surface 20B.

The dimensional proximity between the workpiece 10, the optical device 30(1), and the material removal component 18 may influence the alignment of the predetermined trajectory T1 to the mark line 28. A distance D2 (FIG. 1C) between the material removal component 18 and the first surface 20A of the workpiece 10 may be in a range from two (2) millimeters to forty (40) centimeters. The distance D3 between the marked surface 20B of workpiece 10 and the optical device 30(1) may be in a range from two (2) millimeters to forty (40) centimeters. The distances D2, D3 may be minimized to reduce a complexity of the alignment component 36.

Once the positions 26(1)-26(N) of the calibration point 24 are known, the positions 26(1)-26(N) may be compared to the mark line 28 visually by an operator or by optoelectrical means to determine whether they are within a maximum deviation distance $D_M$ from the mark line 28. In this manner, the predetermined trajectory T1 is verified to minimize rework.

It is noted that respective deviation distances of the positions 26(1)-26(N) of the calibration point 24 to the mark line 28 may also be computationally stored and used to automatically modify the predetermined trajectory T1 to make the predetermined trajectory T1 more consistent with the mark line 28. In this manner, if the predetermined trajectory T1 is later followed, for example to remove the extraneous material 14 from the workpiece 10, then the positions 26(1)-26(N) of the calibration point 24 may be more consistent with the mark line 28 and rework may be further avoided.

Figure 2:
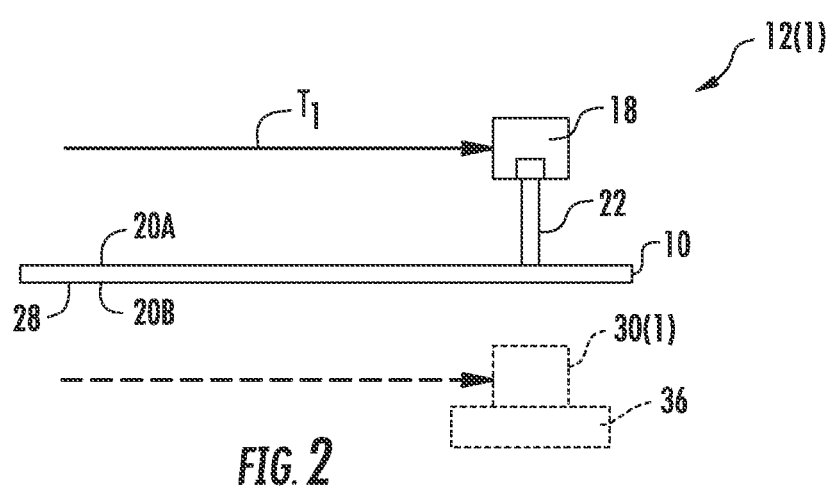
FIG. 2 is a side schematic view of the material removal component of FIG. 1 removing extraneous material of the workpiece as at least one of the material removal component and the workpiece move relative to each other along the predetermined trajectory.

FIG. 2 is a side schematic view of the material removal component 18 removing the extraneous material 14 from the workpiece 10 after the predetermined trajectory T1 is verified against the mark line 28. It is noted that the optical device 30(1) in FIG. 2 is depicted in broken lines to indicate that the optical device 30(1) may be removed during the material removal process. In this manner, the optical device 30(1) is protected from damage.

Figure 3:
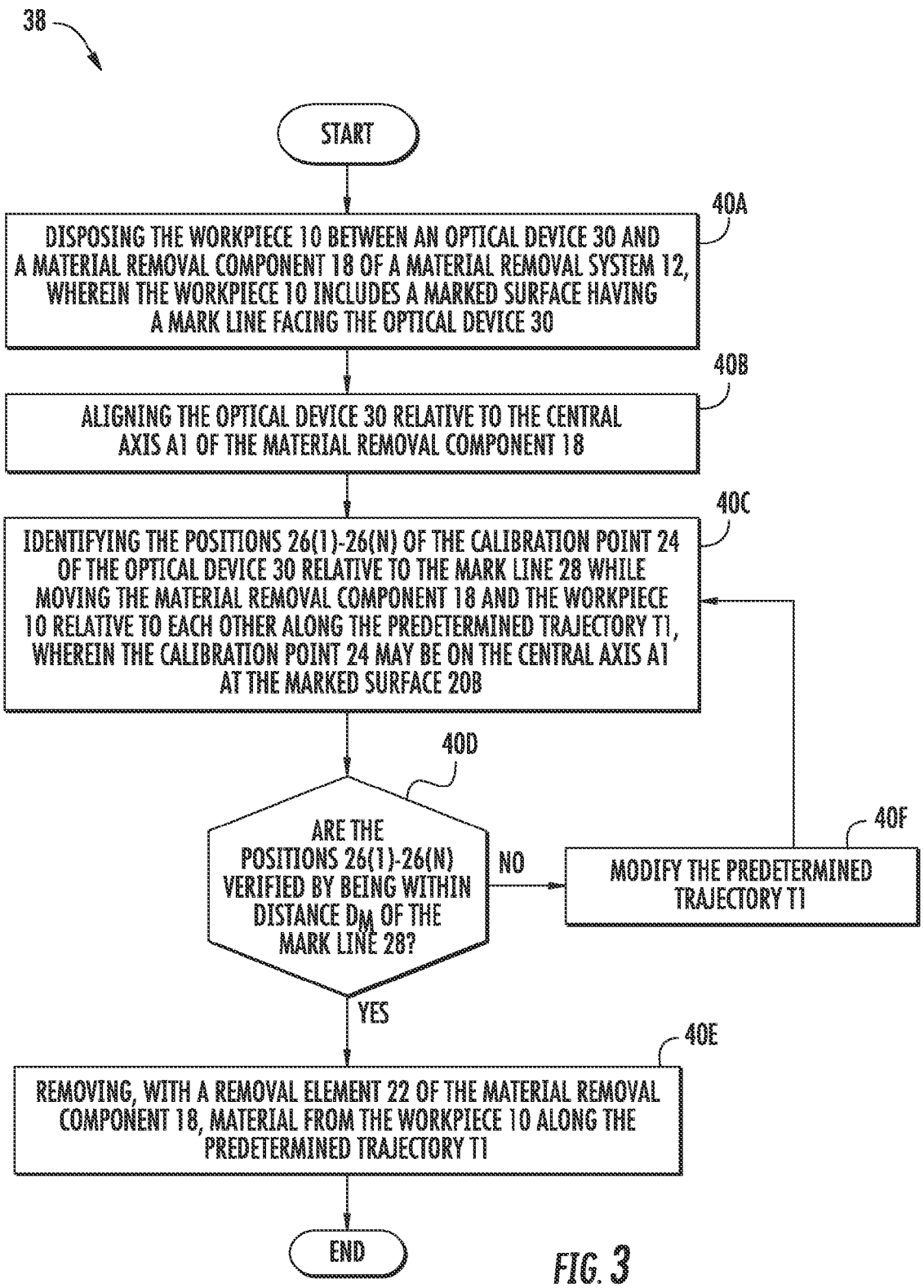
FIG. 3 is a flowchart of an exemplary method of removing extraneous material from the workpiece of FIG. 1A.

FIG. 3 is a flowchart depicting an exemplary method 38 for removing the extraneous material 14 from a workpiece 10. The terminology used to describe the method 38 is consistent with the terminology introduced above with respect to FIGS. 1A-2.

The method 38 includes disposing the workpiece 10 between the optical device 30 and the material removal component 18 of a material removal system 12 (operation 40A in FIG. 3). The workpiece 10 includes the marked surface 20B having the mark line 28 facing the optical device 30. The method 38 also includes aligning the optical device 30 relative to the central axis A1 of the material removal component 18 (operation 40B in FIG. 3). In this manner, at least one of the workpiece 10 and the material removal component 18 are readied to move relative to each other along the predetermined trajectory T1.

The method 38 also includes identifying the positions 26(1)-26(N) of the calibration point 24 of the optical device 30 relative to the mark line 28 while moving at least one of the material removal component 18 and the workpiece 10 relative to each other along the predetermined trajectory T1 (operation 40C in FIG. 3). The calibration point 24 may be on the central axis A1 at the marked surface 20B. In this manner, the positions 26(1)-26(N) of the calibration point 24 are compared relative to the mark line 28.

The method 38 also includes verifying the predetermined trajectory T1 by determining whether the positions 26(1)-26(N) of the calibration point 24 are within the maximum deviation distance $D_M$ from the mark line 28 (operation 40D in FIG. 3). The method 38 includes removing, with the removal element 22 of the material removal component 18, the extraneous material 14 from the workpiece 10 along the predetermined trajectory T1 if the positions 26(1)-26(N) are within the maximum deviation distance $D_M$ from the mark line 28 (operation 40E in FIG. 3). The method 38 includes modifying the predetermined trajectory T1 if the positions 26(1)-26(N) are outside the maximum deviation distance $D_M$ (operation 40F in FIG. 3). In this manner, the extraneous material 14 is removed efficiently.

Figure 4A:
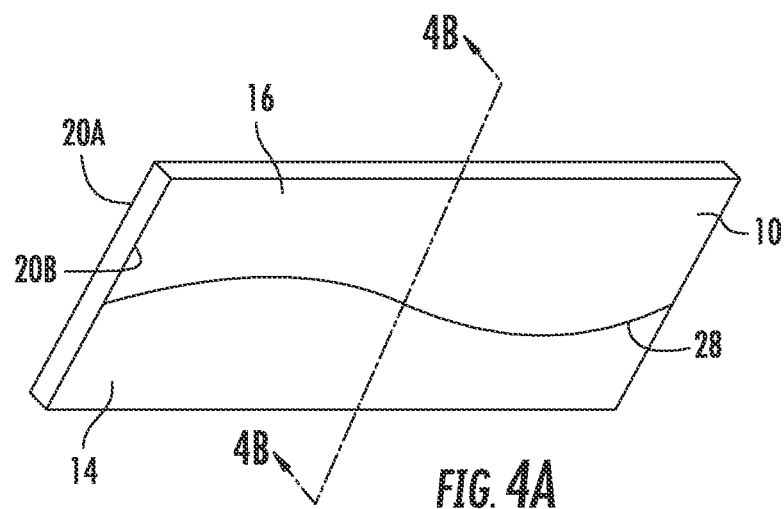
FIGS. 4A through 4C are a bottom perspective view, a side sectional view, and a close-up side sectional view, respectively, of the mark line of the workpiece of FIG. 1A.
Figure 4B:
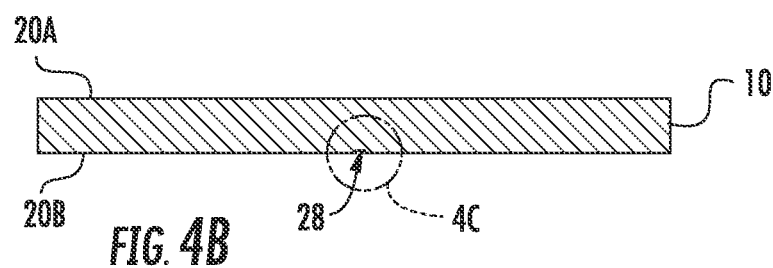
Figure 4C:
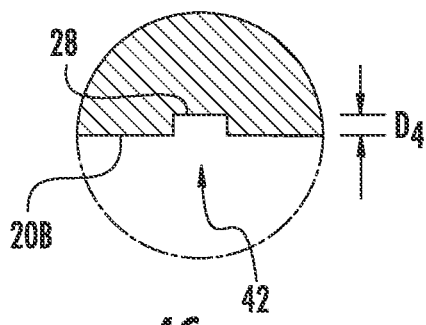
Figure 4D:
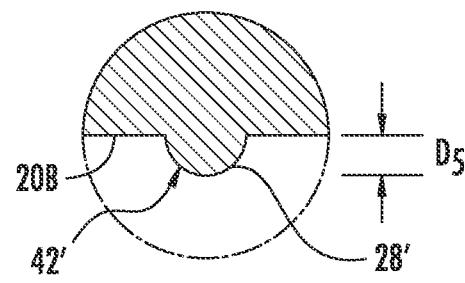
FIG. 4D is a close-up side sectional view of another embodiment of a mark line.

Now that the method 38 for removing the extraneous material 14 from the workpiece 10 has been introduced, specifics related to the mark line 28 are provided consistent with the method 38. FIGS. 4A through 4C are a bottom perspective view, a sectional view, and a close-up sectional view, respectively, of the mark line 28 of the workpiece of FIG. 1A. In this embodiment, the mark line 28 includes a groove shape 42 including a depth D4, for example, less than 0.25 inches. In contrast, FIG. 4D is a close-up sectional view of another embodiment of a mark line 28' including a raised area shape 42' which protrudes a distance D5, for example, less than 0.25 inches from the marked surface 20B. In either embodiment of the mark lines 28, 28', positions 26(1)-26(N) of the calibration point 24 is compared to the maximum deviation distance $D_M$ from the mark line to ensure that the predetermined trajectory T1 is verified.

Figure 5:
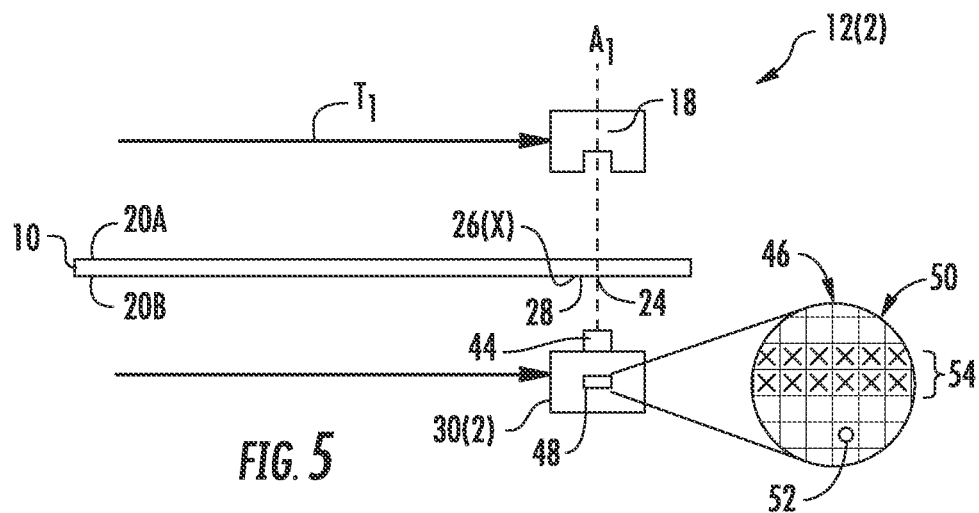
FIG. 5 is a side schematic view of another embodiment of verifying a predetermined trajectory against the mark line using another embodiment of an optical device including an optical sensor for locating the mark line of a workpiece based on pixels in respective images taken along the predetermined trajectory.

FIG. 5 is a top perspective view of another embodiment of an exemplary material removal system 12(2) which verifies the predetermined trajectory T1 against the mark line 28 using another embodiment of an optical device 30(2). The optical device 30(2) includes an optical sensor 44 for locating the mark line 28 of a workpiece 10. In one embodiment, the optical sensor 44 creates an image 46 in an electronic device 48 comprising image pixels 50. The optical sensor 44 is aligned relative to the central axis A1 of the material removal component 18, so that at least one central axis pixel 52 of the image pixels 50 may be associated with the calibration point 24. Moreover, the mark line 28 is optically discernible from other portions of the marked surface 20B free from the mark line 28. For example, the mark line 28 may be groove-shaped and filled with a luminescent material or the marked surface 20B may be illuminated using angularly positioned light sources to accentuate a contrast of the mark line 28 with respect to other portions of the marked surface 20B. In this manner, the mark line 28 is optically identified within the marked surface 20B as mark pixels 54 of the image pixels 50. The image pixels 50 is compared against the at least one central axis pixel 52 to determine whether the positions 26(1)-26(N) of the calibration point 24 are within the maximum deviation distance $D_M$. In this manner, the predetermined trajectory T1 is alternatively verified.

Figure 6:
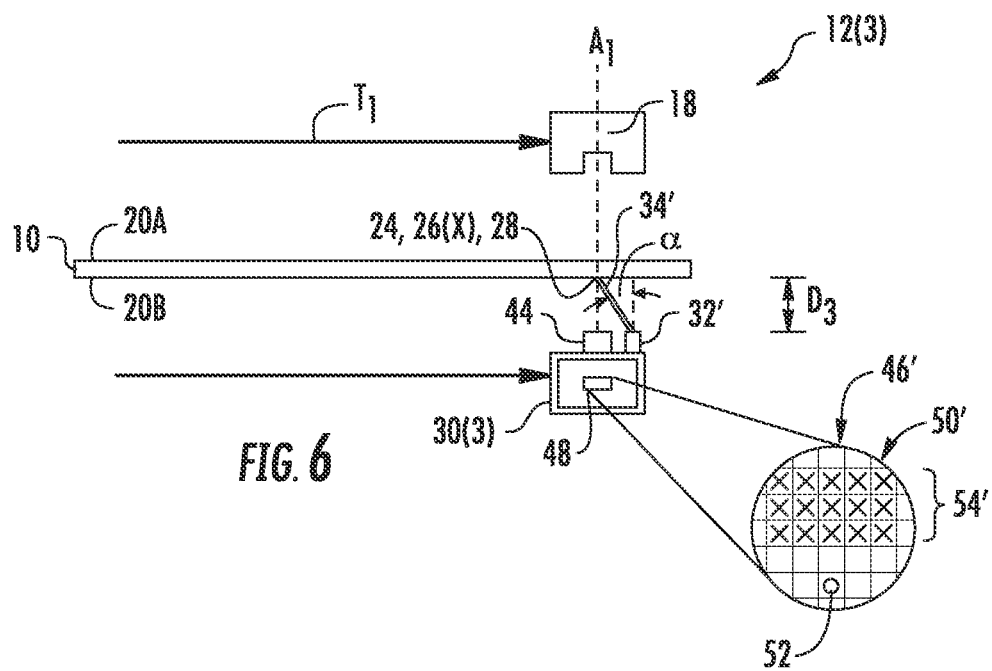
FIG. 6 is a side schematic view of yet another embodiment of verifying a predetermined trajectory against a mark line using another embodiment of an optical device including a light emitter and light sensor for locating the mark line of a workpiece along the predetermined trajectory.

FIG. 6 is a top perspective view of another embodiment of an exemplary material removal system 12(3) which verifies the predetermined trajectory T1 against the mark line 28 using another embodiment of an optical device 30(3). The optical device 30(3) is similar to the optical device 30(2) of FIG. 5 and so only the differences will be discussed in the interest of clarity and conciseness. In this regard, the optical device 30(3) includes a light source 32', for example a laser, configured to emit light 34' at an angle alpha (α) and the distance D3 to illuminate the calibration point 24 upon the marked surface 20B. The calibration point 24 is formed by the optical sensor 44 as the at least one central axis pixel 52'. The light 34' reflects differently when incident upon the mark line 28 as opposed to other portions of the marked surface 20B. This difference is observed in the image 46' in the electronic device 48 comprising image pixels 50'. In this manner, the predetermined trajectory T1 is alternatively verified against the mark line 28.

FIG. 7 is a top perspective view of another embodiment of an exemplary material removal system 12(4) which verifies a predetermined trajectory T1 against the mark line 28 using the alignment component 36. The alignment component 36 comprises a bracket 56 in this embodiment to align an optical device 30(4) relative to the material removal component 18 along the central axis A1 of the material removal component 18. The material removal system 12(4) is similar to the material removal system 12(1) of FIG. 1A and mainly differences will be described for conciseness and clarity. The material removal component 18 may be, for example, a water jet cutter including the removal element 22 (shown in broken line to indicate location when removing material), which may be a water jet. The optical device 30(4) may comprise the light source 32, for example a laser, emitting the light 34.

The bracket 56 may align the optical device 30(4) and the light 34 to the central axis A1 of the material removal component 18. The material removal component 18 faces the first surface 20A of the workpiece 10 and the optical device 30(4) may face the marked surface 20B of the workpiece 10. The bracket 56 is secured to the material removal component 18 at one distal end 60A of the bracket 56 and secured to the optical device 30(4) at another distal end 60B of the bracket 56. In this manner, the light 34 is incident to the workpiece 10 at the calibration point 24 disposed upon the marked surface 20B of the workpiece 10 and the positions 26(1)-26(N) of the calibration point 24 are compared against the mark line 28 located on the marked surface 20B of the workpiece 10. The material removal system 12(4) may further include a video camera 62 to provide images 66 of the calibration point 24 and the mark line 28 to a computer monitor 64. The computer monitor 64 may be viewed by manufacturing personnel to compare positions 26(1)-26(N) of the calibration point 24 against the mark line 28. As long as the positions 26(1)-26(N) of the calibration point 24 are within the maximum deviation distance $D_M$ to the mark line 28, then the trajectory T1 is verified.

With continuing reference to FIG. 7, the workpiece 10 is disposed between the material removal component 18 and the optical device 30(4) by a securing component 59. The securing component 59 secures the workpiece 10 stationary to ground as depicted in FIG. 7 as the material removal component 18 moves along the predetermined trajectory T1. In other embodiments the workpiece 10 may move along the predetermined trajectory T1 and the material removal component 18 may be stationary to ground. In this manner, relative movement between the workpiece 10 and the material removal component 18 along a predetermined trajectory T1 is facilitated.

In some embodiments of the material removal system 12(4), the bracket 56 may be removed from the optical device 30(4) and the material removal component 18 to protect the optical device 30(4) when the removal element 22 of the material removal component 18 is being used to remove the extraneous material 14. In this regard, FIGS. 8A through 8F are a top perspective view, top perspective exploded view, left side view, front side view, bottom view, and top view, respectively, of the bracket 56 secured to the material removal component 18 and the optical device 30(4) of FIG. 7. The bracket 56 may include securing elements 68A, 68B, respectively, at the distal ends 60A, 60B of the bracket 56 to secure the bracket 56 to the material removal component 18 and the optical device 30(4). The securing elements 68A, 68B may respectively include holder elements 70A, 70B. The holder elements 70A, 70B may align the optical device 30(4) to the central axis A1 of the material removal component 18 by respectively applying compression forces $F_CA$, $F_CB$ (FIG. 8A) against the material removal component 18 and the optical device 30(4). The compression forces $F_DA$, $F_CB$ may be generated, for example, by at least one fastener 76A, 76B which may pull the holder elements 70A, 70B to the bracket body 74. The compression forces $F_DA$, $F_CB$ push the material removal component 18 and the optical device 30(4) to abut against alignment surfaces 72A, 72B (FIG. 8B), respectively, of the bracket body 74. The alignment surfaces 72A, 72B when in abutment with the material removal component 18 and the optical device 30(4), respectively, aligns the optical device 30(4) to the central axis A1 of the material removal component 18.

The descriptions of the various embodiments provided in the present disclosure have been presented for purposes of illustration, but are not intended to be exhaustive or limited to the embodiments disclosed. Many modifications and variations will be apparent to those of ordinary skill in the art without departing from the scope and spirit of the described embodiments. For example, the material removal component 18 including the removal element 22, may instead be a material addition component including an additive element (such as a welding machine) to add material to the workpiece 10 instead of removing material from the workpiece 10. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the embodiments provided in the present disclosure may be embodied as a system, method or computer program product. Accordingly, aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments provided in the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments provided in the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The embodiments provided in the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The embodiments of the present disclosure may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments provided in the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments provided in the present disclosure.

Aspects of the embodiments provided in the present disclosure are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments provided in the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments may be devised without departing from the basic scope thereof, and the scope thereof is determined by the claims that follow.

What is claimed is:

1. A method of removing extraneous material from a workpiece, comprising:

disposing the workpiece between an optical device and a material removal component of a material removal system, wherein the optical device is aligned relative to a central axis of the material removal component and wherein the workpiece includes a marked surface having a mark line facing the optical device;

verifying positions of a calibration point of the optical device relative to the mark line while moving at least one of the material removal component and the workpiece relative to each other along a predetermined trajectory, wherein the calibration point is on the central axis at the marked surface; and removing, with the material removal component, extraneous material from the workpiece along the predetermined trajectory.

2. The method of claim 1, further comprising aligning the optical device and the material removal component to the central axis with an alignment component comprising a bracket secured to the optical device at one distal end of the bracket and secured to the material removal component at another distal end of the bracket.

3. The method of claim 2, wherein the disposing the workpiece comprises receiving a portion of the workpiece within the bracket.

4. The method of claim 1, wherein the removing material from the workpiece includes directing a water jet from the material removal component at the workpiece.

5. The method of claim 1, wherein the disposing the workpiece includes disposing the workpiece comprising a composite material between the optical device and the material removal component.

6. The method of claim 1, wherein the positions of the calibration point are verified relative to the mark line along the predetermined trajectory when each of the positions of the calibration point is within a maximum deviation distance from the mark line.

7. The method of claim 1, further comprising modifying the predetermined trajectory when positions of the calibration point relative to the mark lines are outside a maximum deviation distance from the mark line, and verifying positions of the calibration point relative to the mark line while moving at least one of the material removal component and the workpiece relative to each other along the predetermined trajectory as modified.

8. The method of claim 1, wherein the verifying the positions of the calibration point comprises emitting a laser beam from the optical device to the workpiece, and the positions of the calibration point are defined at respective intersection locations of the central axis and the marked surface along the predetermined trajectory.

9. The method of claim 6, wherein the verifying the positions of the calibration point comprises creating respective images with an optical sensor of the optical device and the optical sensor is aligned relative to the central axis of the material removal component.

10. A material removal system, comprising:
- a material removal component configured to remove extraneous material from a workpiece as at least one of the workpiece and the material removal component move relative to each other along a predetermined trajectory; and
- an optical device configured to be aligned relative to a central axis of the material removal component, and the optical device is configured to verify positions of a calibration point upon a marked surface of a workpiece, wherein the workpiece is disposed between the material removal component and the optical device,
- wherein the calibration point is on the central axis and verifiable to a mark line on the marked surface facing the optical device.

11. The system of claim 10, further comprising an aligning component comprising a bracket aligning the optical device relative to the central axis of the material removal component, wherein the bracket is secured to the optical device at one distal end of the bracket and secured to the material removal component at another distal end of the bracket.

12. The system of claim 11, wherein the bracket is configured to receive a portion of the workpiece within the bracket.

13. The system of claim 10, wherein the material removal component is configured to direct a water jet to the workpiece and the water jet is disposed concentric with the central axis.

14. The system of claim 10, further comprising computer numerical control configured to automatically modify the predetermined trajectory when positions of the calibration point relative to the mark lines are outside a maximum deviation distance from the mark line, and the computer numerical control is configured to verify positions of the calibration point relative to the mark line while moving at least one of the material removal component and the workpiece relative to each other along the predetermined trajectory as modified.

15. The system of claim 10, wherein the optical device comprises a laser beam configured to be emitted to the marked surface of the workpiece to verify the positions of the calibration point at respective intersection locations of the central axis and the marked surface of the workpiece.

16. The system of claim 10, wherein the optical device comprises an optical sensor aligned relative to the central axis of the material removal component and arranged to receive light to determine the positions of the calibrated point by creating respective images of intersection locations of the central axis upon the marked surface.

17. The system of claim 10, further comprising an optical sensor to capture and display the positions of the calibrated point and the mark line.

* * * * *